United States Patent
O'Neill et al.

(10) Patent No.: US 10,594,892 B2
(45) Date of Patent: Mar. 17, 2020

(54) HIGH SPEED SERIAL LINK FOR VIDEO INTERFACES

(71) Applicant: Analog Devices Global, Hamilton (BM)

(72) Inventors: David O'Neill, Carlow (IE); Amogh D. Thaly, Caranzalem (IN); David Rowe, Littleton, MA (US); Niall D. O'Connell, Clarina (IE); Lucas Valentin Garcia, Valencia (ES)

(73) Assignee: Analog Devices Global, Hamilton (BM)

(*) Notice: Subject to any disclaimer, the term of this patent is extended or adjusted under 35 U.S.C. 154(b) by 168 days.

(21) Appl. No.: 15/685,379

(22) Filed: Aug. 24, 2017

(65) Prior Publication Data

US 2018/0338063 A1 Nov. 22, 2018

Related U.S. Application Data

(60) Provisional application No. 62/508,061, filed on May 18, 2017.

(51) Int. Cl.
*H04N 1/333* (2006.01)
*H04N 21/4363* (2011.01)
*H04N 1/327* (2006.01)

(52) U.S. Cl.
CPC ..... *H04N 1/33346* (2013.01); *H04N 1/32702* (2013.01); *H04N 1/33323* (2013.01); *H04N 1/33361* (2013.01); *H04N 21/43635* (2013.01)

(58) Field of Classification Search
CPC ......... H04N 1/33346; H04N 21/43635; H04N 1/33323; H04N 1/32702; H04N 1/33361;

(Continued)

(56) References Cited

U.S. PATENT DOCUMENTS 6,646,982 B1 * 11/2003 Chengson ............. H04L 1/22
  370/217
7,187,307 B1    3/2007 Schmidt et al.
(Continued)

FOREIGN PATENT DOCUMENTS

| JP | 2005102161 | 4/2005 |
| JP | 2006211384 | 8/2006 |
| JP | 2013538486 | 10/2013 |

OTHER PUBLICATIONS

"High-Definition Multimedia Interface—Specification Version 1.3a", Gangi Engineering, [Online]. Retrieved from the Internet: <URL: http://www.microprocessor.org/HDMISpecification13a.pdf, (Nov. 10, 2016), 277 pgs.

(Continued)

*Primary Examiner* — Benjamin R Bruckart
*Assistant Examiner* — Tien M Nguyen
(74) *Attorney, Agent, or Firm* — Schwegman Lundberg & Woessner, P.A.

(57) ABSTRACT

This disclosure relates generally to communicating video content and other data over networks. An example apparatus includes a transmitter for communicating data via a serial link with a receiver. The transmitter includes an input, an output interface to the serial link, and translation circuitry. The input includes multiple input data lanes and a clock lane, and the input is configured to concurrently receive data on the multiple input data lanes aligned with a clock signal received on the clock lane according to a multi-lane communication protocol. The output interface is a clock-less interface and includes a number of output data lanes less than a number of the multiple input data lanes. The translation circuitry translates the data received according to the multi-lane communication protocol to a serial link communication protocol for transmission on the serial link.

25 Claims, 8 Drawing Sheets

(58) Field of Classification Search
CPC ..... H04N 1/32475; H04Q 2213/13036; G05B 2219/33254; G05B 2219/25133; G09G 2370/12; G09G 2370/14
See application file for complete search history.

(56) References Cited

U.S. PATENT DOCUMENTS

| | | |
|---|---|---|
| 7,801,257 B2 | 9/2010 | Eglit |
| 8,036,248 B2 | 10/2011 | Lee et al. |
| 8,233,805 B2 | 7/2012 | Tatum et al. |
| 8,644,378 B2 | 2/2014 | Liu et al. |
| 8,861,669 B2 | 10/2014 | Zhang et al. |
| 8,958,497 B2 | 2/2015 | Lee et al. |
| 9,385,859 B2 | 7/2016 | Kuan et al. |
| 2005/0047447 A1 | 3/2005 | Satoh et al. |
| 2009/0022176 A1* | 1/2009 | Nguyen ................ G09G 5/006 370/466 |
| 2013/0215069 A1 | 8/2013 | Lee et al. |
| 2014/0266817 A1* | 9/2014 | Whitby-Strevens ... H04N 19/46 341/51 |
| 2018/0032460 A1* | 2/2018 | Chuang ................ G06F 13/385 |

OTHER PUBLICATIONS

"TMDS (Transition Minimized Differential Signaling)", HDMI-NAVI.com, w/ English Translation, (Mar. 6, 2017), 137 pgs.
"Japanese Application Serial No. 2018-095183, Notification of Reasons for Refusal dated May 13, 2019", w/ English Translation, 21 pgs.
"Japanese Application Serial No. 2018-095183, Examiners Decision of Final Refusal dated Oct. 15, 2019", w/ English Translation, 12 pgs.

\* cited by examiner

|  | CONTROL REGION | | | | | 3 CYCLES<br>VIDEO HEADER | | | 3*N/2 CYCLES<br>VIDEO DATA | | | | | 3 CYCLES<br>VIDEO TRAILER | | | CONTROL REGION | | | | |
|---|---|---|---|---|---|---|---|---|---|---|---|---|---|---|---|---|---|---|---|---|---|
| BIT 0 | HS | HS | HS | HS | HS | VH0 | VH0 | VH2 | 0B0 | 1B0 | 1R0 | ... | (N-1)R0 | VT0 | VT0 | VT2 | HS | HS | HS | HS | HS |
| BIT 1 | VS | CTL2 | VS | VS | VS | VH0 | VH0 | VH2 | 0B1 | 1B1 | 1R1 | ... | (N-1)R1 | VT0 | VT0 | VT2 | VS | CTL2 | VS | VS | VS |
| BIT 2 | 0 | CTL3 | 0 | CTL2 | CTL2 | VH0 | VH0 | VH2 | 0B2 | 1B2 | 1R2 | ... | (N-1)R2 | VT0 | VT0 | VT2 | 0 | CTL3 | 0 | CTL2 | CTL2 |
| BIT 3 |  | 0 |  | CTL3 | 0 | VH0 | VH0 | VH2 | 0B3 | 1B3 | 1R3 | ... | (N-1)R3 | VT0 | VT0 | VT2 |  | 0 |  | CTL3 | 0 |
| BIT 4 |  |  |  | 0 |  | VH0 | VH0 | VH2 | 0B4 | 1B4 | 1R4 | ... | (N-1)R4 | VT0 | VT0 | VT2 |  |  |  | 0 |  |
| BIT 5 |  |  |  |  |  | VH0 | VH0 | VH2 | 0B5 | 1B5 | 1R5 | ... | (N-1)R5 | VT0 | VT0 | VT2 |  |  |  |  |  |
| BIT 6 |  |  |  |  |  | VH0 | VH0 | VH2 | 0B6 | 1B6 | 1R6 | ... | (N-1)R6 | VT0 | VT0 | VT2 |  |  |  |  |  |
| BIT 7 |  |  |  |  |  | VH0 | VH0 | VH2 | 0B7 | 1B7 | 1R7 | ... | (N-1)R7 | VT0 | VT0 | VT2 |  |  |  |  |  |

FIG. 8A

| | Control Region (3 cycles) | | | | | | | | Video Header (3 cycles) | | Video Data (3*N/2 cycles) | | | | | Video Trailer (3 cycles) | | Control Region (3 cycles) | | | | | | | |
|---|---|---|---|---|---|---|---|---|---|---|---|---|---|---|---|---|---|---|---|---|---|---|---|---|---|
| | CTL0 | CTL0 | CTL0 | CTL1 | CTL1 | CTL2 | CTL2 | CTL3 | VH1 | VH2 | 0G | 1G | 1R | ... | (N-2)R | VT1 | VT2 | CTL0 | CTL0 | CTL0 | CTL1 | CTL1 | CTL2 | CTL2 | CTL3 |
| BIT 0 | | | | | | | | 0 | VH1 | VH2 | 0G0 | 1G0 | 1R0 | ... | (N-2)R0 | VT1 | VT2 | | | | | | | | 0 |
| BIT 1 | | | | | | 0 | 0 | 0 | VH1 | VH2 | 0G1 | 1G1 | 1R1 | ... | (N-2)R1 | VT1 | VT2 | | | | | | 0 | 0 | 0 |
| BIT 2 | 0 | 0 | 0 | 0 | 0 | 0 | 0 | 0 | VH1 | VH2 | 0G2 | 1G2 | 1R2 | ... | (N-2)R2 | VT1 | VT2 | 0 | 0 | 0 | 0 | 0 | 0 | 0 | 0 |
| BIT 3 | | | | | | | | | VH1 | VH2 | 0G3 | 1G3 | 1R3 | ... | (N-2)R3 | VT1 | VT2 | | | | | | | | |
| BIT 4 | | | | | | | | | VH1 | VH2 | 0G4 | 1G4 | 1R4 | ... | (N-2)R4 | VT1 | VT2 | | | | | | | | |
| BIT 5 | | | | | | | | | VH1 | VH2 | 0G5 | 1G5 | 1R5 | ... | (N-2)R5 | VT1 | VT2 | | | | | | | | |
| BIT 6 | | | | | | | | | VH1 | VH2 | 0G6 | 1G6 | 1R6 | ... | (N-2)R6 | VT1 | VT2 | | | | | | | | |
| BIT 7 | | | | | | | | | VH1 | VH2 | 0G7 | 1G7 | 1R7 | ... | (N-2)R7 | VT1 | VT2 | | | | | | | | |

FIG. 8B

HIGH SPEED SERIAL LINK FOR VIDEO INTERFACES

CLAIM OF PRIORITY

This application claims the benefit of priority under 35 U.S.C. § 119(e) to U.S. Provisional Patent Application Ser. No. 62/508,061, filed on May 18, 2017, which is hereby incorporated by reference herein in its entirety.

FIELD OF THE DISCLOSURE

This document relates generally to communicating video content and other data over networks. Some embodiments relate to a serial communication link that reduces the number of lines needed between the data sources and the data destinations of the network.

BACKGROUND

Communication networks are used to distribute video content, audio content, and data. For example, a conference center or a hotel may want to distribute high definition video content over a communication network local to the hotel or conference center. Many of the networks use switch matrices to route the video from any of several sources to any of several destinations. The demand on bandwidth for these networks continues to grow. However, increased bandwidth can lead to challenges in interconnecting the networks.

SUMMARY OF THE DISCLOSURE

This document relates generally to communicating video content and other data over networks. In some embodiments, a method of controlling operation of a serial link includes: receiving data at a transmitter of the serial link according to a first communication protocol, wherein the first communication protocol includes receiving the data on multiple data lanes concurrently and aligned with a clock signal received on a clock lane; translating the received data received according to the first communication protocol to a serial link communication protocol for transmission on the serial link, wherein the second communication protocol excludes the clock signal; and transmitting the received data from the transmitter to a receiver of the serial link according to a second communication protocol, where the second communication protocol excludes the clock signal and includes transmitting the received data via the serial link using less data lanes than the first communication protocol; and transmitting the received data from the transmitter to a receiver of the serial link according to the second communication protocol using less data lanes than the first communication protocol.

In some embodiments, a transmitter (for communicating data via a serial link with a receiver) includes: an input including multiple input data lanes and a clock lane, wherein the input is configured to concurrently receive data on the multiple input data lanes aligned with a clock signal received on the clock lane according to a multi-lane communication protocol; an output interface to the serial link, wherein the output interface is a clock-less interface and includes a number of output data lanes less than a number of the multiple input data lanes; and translation circuitry configured to translate the data received according to the multi-lane communication protocol to a serial link communication protocol for transmission on the serial link.

In some embodiments, a receiver (for communicating data via a serial link with a transmitter) includes: an input interface to the serial link, wherein the input interface is a clock-less interface and is configured to receive data via a number of data lanes according to a serial link communication protocol; an output including a clock lane and number of data lanes greater than the number of data lanes of the input interface, wherein data is provided on the data lanes of the output aligned with a clock signal provided on the clock lane according to a multi-lane communication protocol; and translation circuitry configured to translate the data received according to the serial link communication protocol to the multi-lane communication protocol; and clock generator circuitry configured to generate the clock signal using the data received according to the serial link communication protocol.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 8A and 8B are diagrams of an example of data for two data streams to be sent over a two lane high speed serial link.

DETAILED DESCRIPTION

Communication networks are used to distribute video content, audio content and data from sources to the destinations. These networks can be hardwired and can include one or more switch matrices to route the video content, audio content and data. As the number of sources and destinations of the video content, audio content and data increases, the routing and design for the networks can become complicated.

Figure 1:
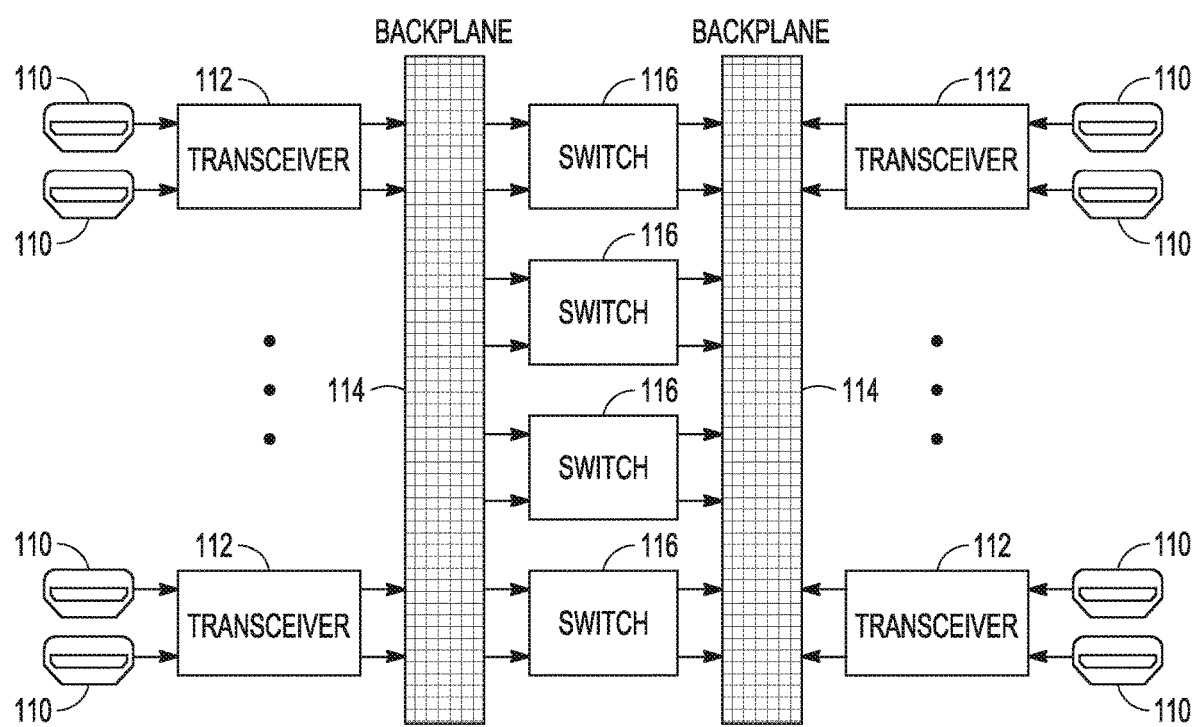
FIG. 1 is a diagram of a matrix system for routing video data, audio data and other data.

FIG. 1 is a diagram of a matrix system for routing video data, audio data and other data (e.g., data such as text, information from websites, etc.). The ports 110 in FIG. 1 represent sources of data and destinations for the data. Any of the ports 110 can be both a source and a destination. The ports provide data to transceivers 112 according to a communication protocol. The transceivers 112 may be included on printed circuit boards (PCBs) that are coupled to a backplane. The example of FIG. 1 shows two backplanes 114. The interconnection between the backplanes and from board to board is provided by cross point switches 116. In some examples, the transceivers 112 and one or more cross point switches 116 can be included on the same PCB. In some examples, the ports 110 are high definition multimedia interface (HDMI) ports and the transceivers 112 are HDMI transceivers that receive and transmit data according to an HDMI protocol (e.g., HDMI 1.4, HDMI 2.0, etc.).

Figure 2:
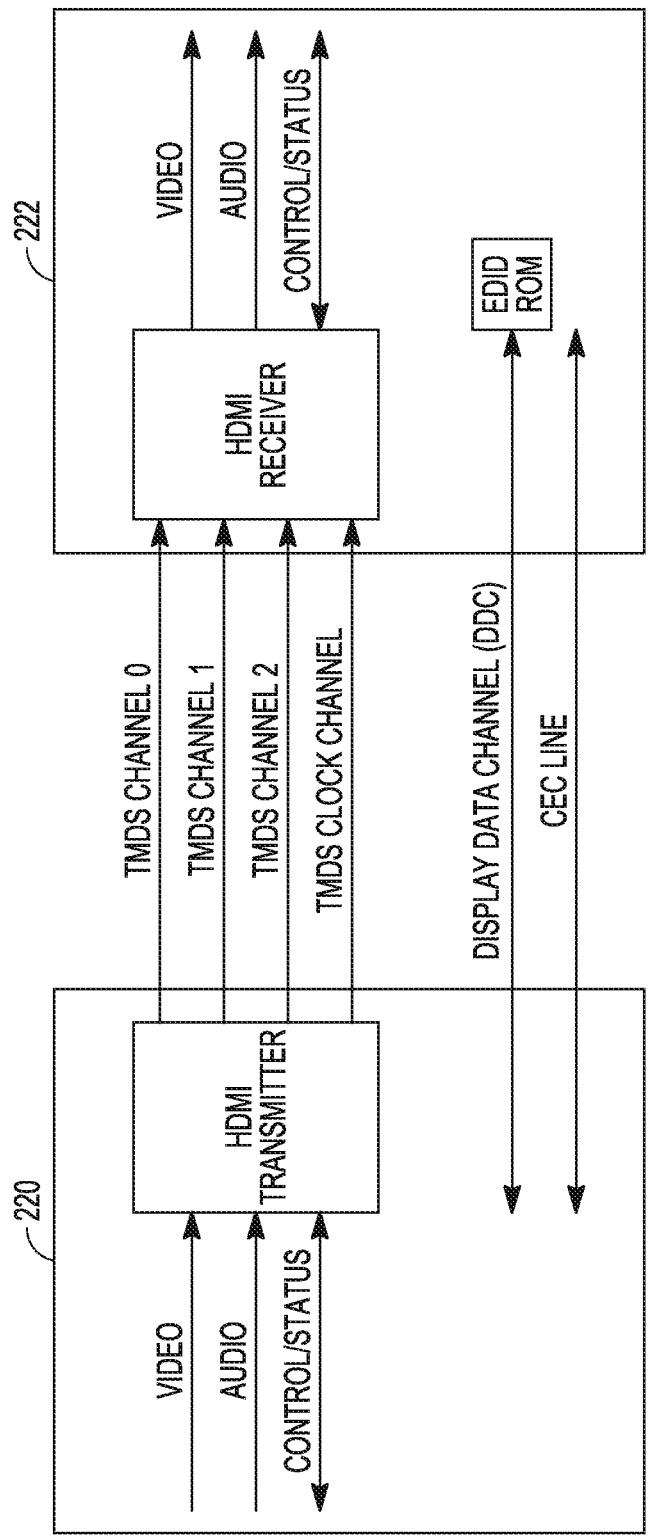
FIG. 2 is a block diagram of a high definition multi-media interface link.

FIG. 2 is a block diagram of an HDMI link. To simplify the diagram, one transceiver is shown as an HDMI transmitter 220 and the other transceiver is shown as an HDMI receiver 222. The HDMI main link includes four lanes or channels; three data lanes and a clock lane. Each lane may include two low voltage differential signaling (LVDS) lines or each lane may be a current mode logic (CML) lane. The HDMI main link implements transition minimized differential signaling (TMDS) and can be referred to as a TMDS channel. Video and audio data is received by the HDMI transmitter 220 and transmitted to the receiver 222 over the HDMI main link.

As the number of sources and destinations of the video and audio data increases, the number of lines needed to implement the matrix system of FIG. 1 increases. For example, each cross point switch in the example of FIG. 1 may route 512 lines. This can complicate board routing and design for testing of the matrix system. Reducing the number of lines to transmit the video and audio data would simplify the interconnection of the matrix system, but the system would still have to be compatible with the original communication protocol used at the ports 110 (e.g., the HDMI protocol).

Figure 3:
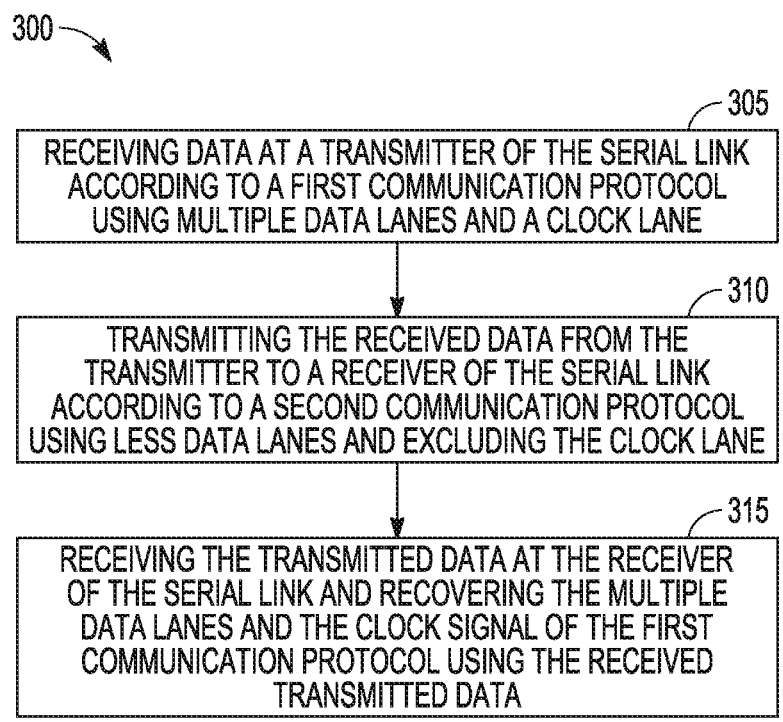
FIG. 3 is a flow diagram of a method of operating a high speed serial link.

FIG. 3 is a flow diagram of a method 300 of operating a high speed serial link. The serial link reduces the number of lanes needed to communicate video, audio, and data from the number of lanes used in conventional video interfaces.

At 305, data is received at a transmitter of the serial link according to a first multi-lane communication protocol (e.g., the HDMI protocol, the mobile industry processor interface (MIPI) protocol, etc.). In the multi-lane communication protocol, data (e.g., video data, audio data, and other data) is received on multiple data lanes, and the data is aligned with a clock signal received on a clock lane.

At 310, the received data is transmitted via the serial link from the transmitter to a receiver of the serial link according to a second serial link communication protocol. Communication using the serial link communication protocol excludes the clock signal and the serial link includes less data lanes than the number of lanes used in the multi-lane communication protocol. In some embodiments, the serial link includes only one data lane.

At 315, the transmitted data is received at the receiver end of the serial link using the reduced number of data lanes. The multiple data lanes and the clock lane of the multi-lane communication protocol are recovered at the receiver end from the received transmitted data. The data is then communicated from the receiver end according to the recovered multi-lane communication protocol. In this way, the original lanes for communication are reduced and then restored, allowing the sources and destinations in FIG. 1 to communicate with reduced interconnection.

Figure 4:
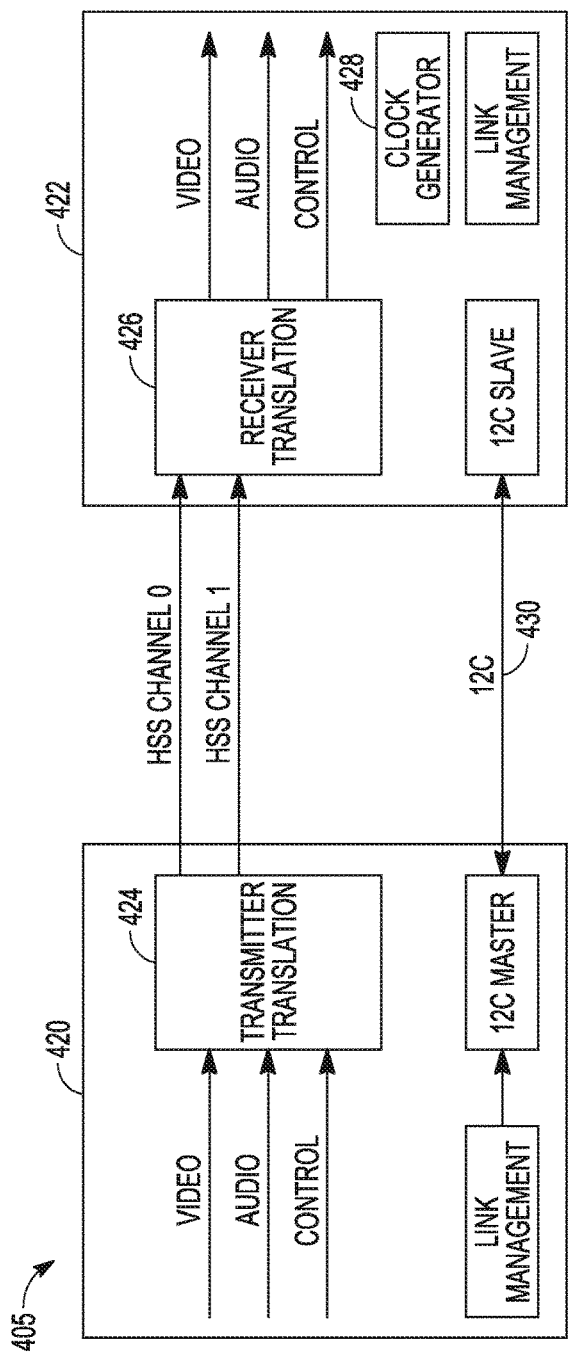
FIG. 4 is a block diagram of portions of an example of a data communications system that includes a high speed serial link.

FIG. 4 is a block diagram of portions of an example of a data communications system that includes a high speed serial link. The serial link 405 communicates video data and auxiliary data using a minimized number of lanes. The example embodiment in FIG. 4 shows two data lanes labeled channel 1 and channel 0, but in some embodiments the serial link may only include one data lane. The data lanes may be differential signaling lanes (e.g., current mode logic lanes or CML lanes). The example embodiment shows a transmitter circuit 420 and a receiver circuit 422 for simplicity. An actual implementation may include transceivers on both ends of the link that are able to both transmit and receive data. The circuits described herein can be implemented using hardware such as field programmable gate arrays (FPGAs), application specific integrated circuits (ASICs), or one or more processors (e.g., microprocessors) executing instructions in firmware or software. The transceiver pair can be arranged between the source of the data and the destination for the data. The interconnection is arranged between the transceivers. The interconnection may include a switching network. The interconnection may be between boards (inter-board) and may include a back plane, or the interconnection may be contained within a board (intra-board).

The input to the transmitter circuit includes the multiple input data lanes and the clock lane. The transmitter output interface to the serial link 405 does not include a clock lane and includes a number of data lanes that is less than the number of input data lanes. The data is transmitted on the serial link 405 using a serial link communication protocol. The transmitter circuit 420 includes transmitter translation circuitry 424 that translates the data received according to the multi-lane communication protocol to data for transmission on the serial link according to the serial link communication protocol. To support the incoming multiple data lanes with less data lanes on the serial link, data is transmitted on the serial link at a faster rate than data is received by the multiple data lanes at the input. The transmitter translation circuitry 424 may perform time interleaving of the data received on the multiple data lanes to transfer data as a data stream on the reduced number of lanes.

In some examples, the serial link includes two data lanes as shown in the example embodiment of FIG. 4. In some examples, the serial link includes only one data lane. The number of data lanes in the serial link may determine the conventional communication protocol that is supportable by the serial link. For instance, if the link clock at the transmitter circuit 420 has a frequency of nine gigahertz (9 GHz), a one lane serial link can support a 3 GHz HDMI 1.4 protocol, and a two lane serial link can support a 6 GHz HDMI 2.0 protocol.

The receiver circuit 422 includes an input interface to the serial link 405 and receives data via the serial ink without a clock signal for synchronization. The receiver circuit 422 includes receiver translation circuitry 426 that translates the data received according to the serial link communication protocol back to the multi-lane communication protocol. The receiver circuit 422 includes clock generator circuitry 428 that generates the clock signal of the multi-lane protocol using the data received at the input interface from the serial link. The output of the receiver circuit 422 includes the clock lane and original number of data lanes of the multi-lane communication protocol. The data on the data lanes at the output is synchronized to the clock signal provided on the clock lane.

Returning to FIG. 1, if the conventional HDMI transceivers 112 are replaced with serial link transceivers, the number of lanes to be routed per port 110 is reduced by two to four times depending on the number of lanes in the serial link. This may reduce the amount of routing needed to service the same number of ports 110, or it may increase the number of ports 110 that can be serviced for the same amount of routing in the system of FIG. 1.

A challenge related to eliminating the clock lane is in recovering the video clock signal at the receiver end using the data received via the serial link. The HDMI protocol is a TMDS protocol that minimizes transitions in the data, and transitions or edges in the data are used to recover the clock. The transmitter translation circuitry 424 converts or encodes the data received from the multiple lanes to increase the edge rate of the data transmitted via the serial link. In some examples, the transmitter translation circuitry 424 encodes the data using eight-bit 10-bit (8b10b) encoding to provide a consistent edge rate to allow clock recovery from the data stream transmitted via the serial link.

Figure 5:
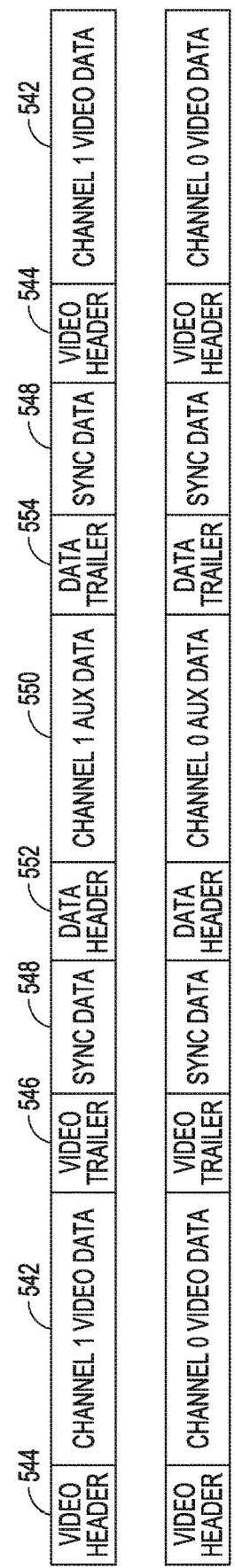
FIG. 5 is a high level diagram of data streams transmitted over the high speed serial link of FIG. 4.

FIG. 5 is a high level diagram of data streams transmitted over the serial link 405 of FIG. 4. The example in FIG. 5 shows two data streams for two data lanes designated channel 1 and channel 0. Video data 542 can be packed into the data streams and the video data can be marked using a video header 544 and video trailer 546 for identification in the receiver circuit 422 of FIG. 4. The video data payload may be encoded using 8b10b encoding and may be scrambled prior to encoding to minimize effects from electromagnetic interference (EMI). The video header & trailer regions may be encoded as 8b10b K-control characters or symbols for identification, and the video trailer region may include a unique video trailer sequence for scrambling synchronization. The video header and trailer regions may be scrambled prior to encoding to minimize effects of EMI. A scrambling synchronization character may be included for scrambling synchronization. The scrambling character may be an 8b10 K-control character.

The data streams may include sync data regions 548 that contain horizontal synchronization (hsync) and vertical synchronization (vsync) information for the video data. The sync data regions 548 may be scrambled and encoded using 8b10b encoding. A burst including dedicated 8b10b K-control characters (e.g., 8b10b K-comma characters) may periodically be sent in the sync data regions 548 to form a unique sequence used for recovering symbol and lane alignment in the receiver circuit 422. The data streams may include auxiliary data packets 550 that include audio data or other data packet information in the horizontal blanking region. The data packets may be scrambled and encoded as 8b10b and may be marked using a data header 552 and data trailer 554 encoded as 8b10b K-control characters to allow identification of the data regions by the receiver translation circuitry. Similar to the video and sync regions, the auxiliary data may be scrambled prior to encoding to minimize effects from EMI.

Figure 6:
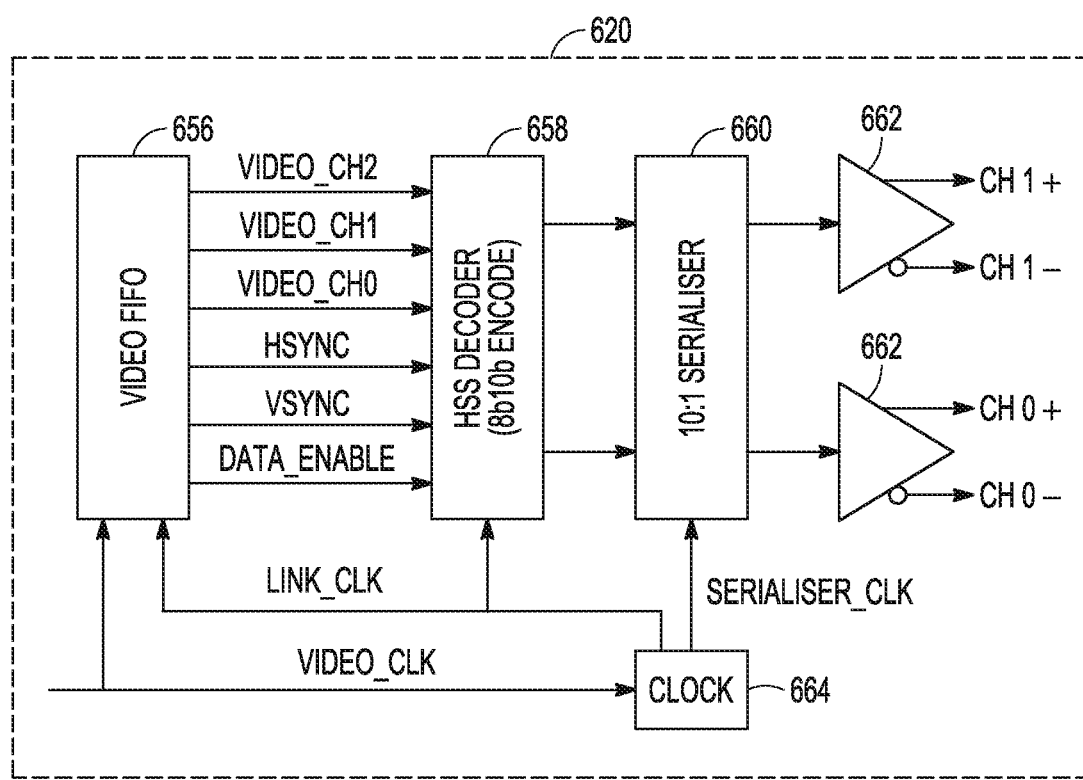
FIG. 6 is a block diagram of portions of an example of the transmitter circuit of the high speed serial link of FIG. 4.

FIG. 6 is a block diagram of portions of an example of the transmitter circuit 420 of the serial link of FIG. 4. The transmitter translation circuitry includes encoder circuitry 658 (e.g., an 8b10b encoder) and a serialiser circuitry 660 (e.g., a 10b:1b serialiser if 8b10b encoding is used). The encoder circuitry 658 may include multiplexing circuitry to multiplex the data received on the multiple data lane protocol to the lesser number of data lanes for transmission according to the serial link protocol. Differential drivers 662 are used to drive the serial link data lanes.

The transmitter circuit 620 provides data on the data lanes based on a frequency derived from the source video clock signal (video_clk) of the clock lane of the multi-lane communication protocol. The transmitter circuit 620 may include a link clock circuit 664 that generates a link clock signal for the serialiser and the data lanes of the serial link. The transmitter circuit 620 may include a first-in first out buffer (FIFO) 656 to buffer video data received at the video clock rate for transmission at the link clock rate. The video data may buffered prior to encoding for transmission. Audio data and packet data can also be sent to the encoder circuitry 658 for transmission over the serial link. The audio and packet data can transferred over the serial link during a horizontal blanking period of the video data.

The link clock circuit 664 may include a phase locked loop (PLL) circuit that is locked to the frequency of the source video clock signal. The ratio between the link clock generated from the PLL and the video clock is determined by the number of data lanes in the serial link (one or two), the video bit-depth, and the pixel repetition factor. Pixel repetition can be used to increase the speed of the serial link to provide more bandwidth to transmit audio and packet data. Pixel repetition can also be used restrict the operating frequency range of the link. The ratio between the link clock and the video clock can be expressed as:

$$link\_clock=video\_clock*(3/No.\ of\ lanes)*(color\text{-}depth/8)*(pixel\ repetition).$$

The maximum link clock frequency is 900 MHz. The examples below show the ratios between the link clock frequency and the video clock frequency for some scenarios.

Two-lane serial link:
24 bpp: link clock=3/2 video clock
30 bpp: link clock=15/8 video clock
36 bpp: link clock=9/4 video clock One-lane serial link:
24 bpp: link clock=3/1 video clock
30 bpp: link clock=15/4 video clock
36 bpp: link clock=9/2 video clock To facilitate clock recovery in the receiver, the transmitter measures the link clock frequency using a reference clock signal. In certain examples, the reference clock signal is provided using a 27 MHz crystal (XTAL). The result of this measurement may be sent to the receiver circuit via the inter-integrated circuit (I2C) link 430 of FIG. 4.

Figure 7:
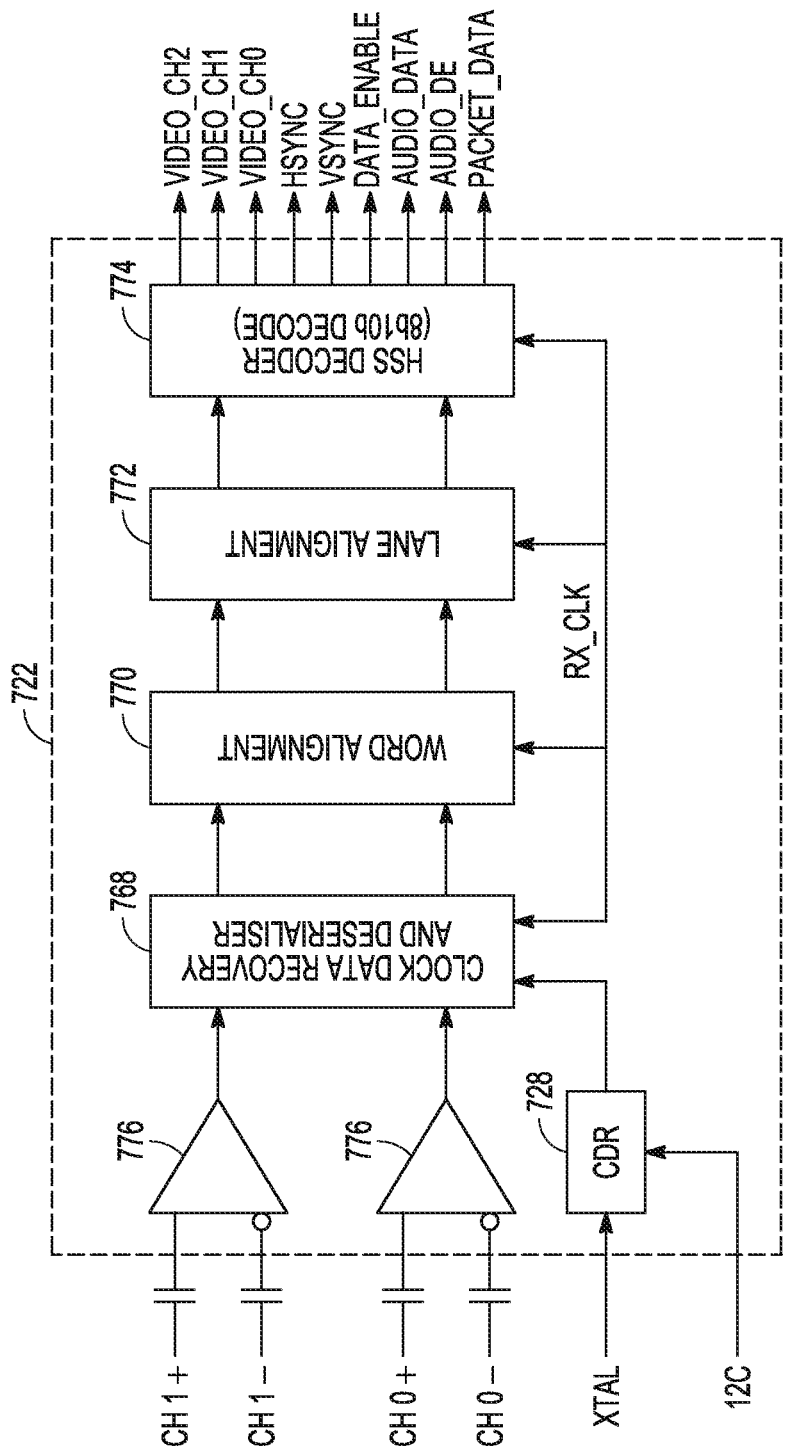
FIG. 7 is a block diagram of portions of an example of a receiver circuit of the high speed serial link of FIG. 4.

FIG. 7 is a block diagram of portions of an example of the receiver circuit 422 of the serial link of FIG. 4. The receiver translation circuitry of the receiver circuit 722 includes a deserialiser circuitry 768 that de-multiplexes data on the received data streams, a word alignment circuitry 770, lane alignment circuitry 772, and decoder circuitry 774.

The receiver circuit 722 also includes clock data recovery (CDR) circuitry 728. To facilitate clock recovery in the receiver circuit, the serial link may support the transfer of a reference frequency from the transmitter to the receiver. The clock lane frequency at the transmitter circuit 420 is measured with respect to a reference crystal (e.g., a 27 MHz crystal) and can be sent to the receiver circuit 422 via the I2C link. The CDR circuitry 728 may use this information for clock recovery. In some examples, the CDR circuitry 728 includes a PLL circuit. The PLL may be programmed to a center frequency of the signal provided from the transmitter via the I2C link. The CDR circuitry 728 locks to the incoming data rate using the PLL output as a reference and generates a receiver-side link clock signal which is locked to an incoming data stream. Thus, the PLL can be viewed as providing a coarse guide for video clock and the CDR circuitry 728 uses the data edge rate to recover the actual video clock of the data source. The downstream alignment and decoding is clocked from the CDR output clock signal.

As explained previously, audio data may be transmitted over the serial link. Audio data may be received at the transmitter circuit 620 based on an audio clock signal and sent to the encoder circuitry 658 according to the link clock signal. The relationship between the link clock frequency and the audio clock frequency can be expressed as $$audio\_clk=link\_clk\times(No.\ of\ lanes/3)\times(N/M),$$

where M and N are positive integers. The values of M and N may be sent over the serial link to the receiver. The audio clock signal may be provided to the encoder circuitry 658 to allow automatic calculation of an audio control packet using the link clock and M/N ratio.

FIGS. 8A and 8B are diagrams of an example of data for two data streams to be sent over the serial link from the transmitter circuit to the receiver circuit using a two data lane link. The example is similar to the example of FIG. 5 except that only the control and video data are shown in FIGS. 8A and 8B and not the auxiliary data. Individual characters of the data are shown as bytes in the columns. Data is provided from left to right to the serialiser circuitry 660 of FIG. 6. The characters are shown as 8-bit bytes. The encoder circuitry 658 may encode the characters to 10-bits using 8b10b encoding before being provided to the serialiser circuitry 660. The 10-bit encoded words are transmitted on the serial link at ten times the byte rate.

The video data may include 24 bit red-green-blue (24 bit RGB) video data encoded as bytes of serial link data. In some embodiments, 30 bit or 36 bit RGB video data is sent. To support the higher bit-depth modes, the serial link can be increased to 1.25 times or 1.5 times the 24 bit data rate. In some embodiments, YCbCr video data (e.g., 444, 422, or 420 YCbCr data) is encoded into the bytes of data. Pixel repetition by integer factors may be used to increase the data rate. Pixel repetition can provide more bandwidth to support transmitting audio packets or other data information. Pixel repetition can also reduce the range of frequencies the serial link needs to support. In the example of FIGS. 8A and 8B, a 24 bit video header is sent in a data stream to indicate the start of the video data and a 24 bit video trailer may be encoded and sent to indicate the end of the video data. Horizontal synchronization (HS) and vertical synchronization (VS) information for the video data can be included in the control region of one or both of the channels.

Returning to FIG. 6, the encoding circuitry 658 may add alignment characters to the data to be transmitted to demarcate boundaries in the data to facilitate word or symbol alignment (intra-lane alignment) and alignment between lanes (inter-lane alignment). If the data to be transmitted is 8b10b encoded, the alignment characters are used to demarcate character boundaries in the 8b10b encoded data. In some embodiments, the one or more alignment characters are 8b10b K-control symbols. In certain embodiments, the encoding circuitry 658 adds an 8b10b comma character to the data to be transmitted over the serial link. In some embodiments, the alignment characters or symbols are added after stripping out the old control characters and after the data is multiplexed as part of the reduction in the number of data lanes.

As explained previously, the transmitter side of the serial link may receive data according to the HDMI protocol. As part of the encoding, the encoding circuitry 658 may remove HDMI-specific characters in the received data and add one or more alignment characters to the data to be transmitted over the serial link. In some embodiments, the encoding circuitry 658 removes one or more HDMI control characters from a control region of the HDMI data packet and adds one or more 8b10b K-control characters or symbols as alignment characters. In certain embodiments, the encoding circuitry 658 replaces one or more HDMI control characters from a control region just following the video data with an 8b10b control character.

Returning to FIG. 7, the receiver circuitry receives the data serially using deserialiser circuitry 768 and provides the data to the word alignment circuitry 770. The word alignment circuitry 770 uses the alignment characters for intra-lane alignment to detect word or symbol boundaries in the serial data. Lane alignment circuitry 772 uses the alignment characters to check inter-lane alignment by comparing latency between the data lanes in the detection of the alignment characters. The de-interleaving of the video data can be referenced to the position of any of the video header or trailer characters, the audio header or trailer characters, or any control 8b10b K characters inserted into the data. The received characters are then provided to decoder circuitry 774 to remove the 8b10b encoding and restore the data to the first multi-data lane protocol. The output of the decoder circuitry 774 will be data referenced to the recovered clock produced by the clock generator circuitry.

As explained previously, in some embodiments the multi-data lane protocol includes the HDMI protocol. However, the HDMI protocol needs control characters for alignment and as guard band characters for video, audio and other data. The HDMI protocol uses more control characters than are available using 8b10b encoding. To reduce the number of control characters from the HDMI protocol, the serial link protocol may encode the control region in the same way as the data region. The same control characters demarcate video data, audio data, data packets, and control words in the data. This reduces the number of control characters required. Also, the serial link protocol may include 8b10b encoded leading and trailing guard band characters to indicate the start and end of data for both the audio and video data.

In some embodiments, the encoding circuitry 658 of FIG. 6 replaces the HDMI video, audio, and data guard band characters with 8b10b encoded control symbols. The encoding circuitry 658 may replace at least a portion of the control region following the video data with a trailing video guard band that includes 8b10b encoding. In some embodiments, the encoding circuitry 658 replaces bits of the control region with a same number of bits of 8b10b encoding as the trailing video guard band. In certain embodiments, the entire control region is replaced with 8b10 encoded characters. In some embodiments, the trailing video guard band includes one or more 8b10b K-control characters. In certain embodiments, an alignment character includes at least two consecutive 8b10b comma characters.

As explained above, the data may be scrambled prior to encoding to minimize effects from EMI. Scrambling of the guard band characters avoids repeating patterns in the guard band data that may appear as tones in frequency spectrum. In the example embodiment of FIG. 6, transmitter circuit 620 may include scrambling circuitry to scramble data to be transmitted via the serial link. In some variations, the scrambling circuitry may include a linear feedback shift register (LFSR) to implement the scrambling. In some variations, the scrambling circuitry implements iToggle scrambling. In certain embodiments, the scrambling circuitry is arranged before the FIFO 656 to scramble the video characters received by the transmitter circuit 620 according to the multi-data lane communication protocol. In certain embodiments, the scrambling circuitry is arranged before the encoding circuitry 658. The scrambled data is encoded, serialized and transmitted to the receiver circuit via the serial link. In the example embodiment of FIG. 7, receiver circuit 722 may include descrambling circuitry to descramble the data received via the serial link. The descrambling circuitry may be arranged after the decoder circuitry 774 to descramble characters decoded from 8b10b encoding.

In some embodiments, the transmitter circuit 620 includes a scrambling control character in the transmitted data. The scrambling control character indicates reset of the scrambling. The scrambling control character may be used by the receiver circuit to align its descrambling of the received data. In some embodiments, the transmitter circuit 620 receives scrambled data according to the multi-data lane protocol. The encoder circuitry 658 may replace a scrambling control character of the multi-data lane communication protocol with an 8b10b encoded scramble control character. In some embodiments, the 8b10b encoded scramble control character is the 8b10b comma character.

As explained previously, the maximum clock frequency of the link clock at the transmitter circuit may be 900 MHz. It may be challenging to implement a system with a 900 MHz clock. An alternative is to pack the 10 bits of 8b10b encoded data as multiples of the 10 bits of encoded data. For example, packing 10 bit characters into one 20 bit character allows the clock to be half the frequency, or 450 MHz, while achieving the same link data rate. Packing multiple 10 bit characters into one transfer allows easier transfer of data blocks, but can pose other challenges. For example, the multiplexing and packing of the characters needs to avoid splitting control characters and alignment characters need to be inserted in the correct sequence. An approach to avoid problems when combining multiple characters is for the serialiser circuitry to insert the alignment characters after the data multiplexing. This reduces complexity of inserting the alignment characters and ensures a continuous stream of alignment characters are received at the receiver circuit.

The circuits, methods and systems described herein reduce the number of lanes used to communicate video content and audio content received from a source according to a standard protocol, communicates the video content and audio content using a network interconnection using the reduced number of lanes, and then restores the original protocol for reception by the destination. This allows communication of video, audio and data with reduced interconnection between the sources and the destinations. Many of the embodiments have been described in relation to the HDMI protocol, but the methods described can be employed to communicate data using any multi-lane communication protocol.

EXAMPLES AND ADDITIONAL DESCRIPTION

Example 1 can include subject matter (such as a method comprising acts to control operation of a serial link, or a computer readable storage medium including instructions that, when performed by processing circuitry of a computing device, cause the computing device to perform the acts), comprising receiving data at a transmitter of the serial link according to a first communication protocol, wherein the first communication protocol includes receiving the data on multiple data lanes concurrently and aligned with a clock signal received on a clock lane; transmitting the received data from the transmitter to a receiver of the serial link according to a second communication protocol, where the second communication protocol excludes the clock signal and includes transmitting the received data via the serial link using less data lanes than the first communication protocol; and receiving the transmitted data at the receiver of the serial link and recovering the multiple data lanes and the clock signal of the first communication protocol from the received transmitted data.

In Example 2, the subject matter of Example 1 optionally includes receiving video data on the multiple data lanes according to a high definition multi-media interface (HDMI) protocol.

In Example 3, the subject matter of Example 2 optionally includes receiving the data on three data lanes, and wherein the transmitting the received data includes transmitting the video data on one data lane without the clock signal.

In Example 4, the subject matter of one or any combination of Examples 1-3 optionally includes translating the data received at the transmitter from the first communication protocol to the second communication protocol, wherein data transmitted according to the second communication protocol includes a higher edge rate for the same data received using the first communication protocol.

In Example 5, the subject matter of one or any combination of Examples 1-4 optionally includes the first communication protocol including the HDMI protocol and the second communication protocol including eight-bit to ten-bit (8b10b) encoding.

In Example 6, the subject matter of Example 5 optionally includes removing HDMI-specific characters in the received data and adding alignment characters to the received data to be transmitted according to the second communication protocol, wherein the alignment characters include 8b10b control symbols that demarcate boundaries in the received data to be transmitted.

In Example 7, the subject matter of Example 6 optionally includes removing characters from a control region of an HDMI data packet and replacing the characters with the alignment characters.

In Example 8, the subject matter of one or both of Examples 6 and 7 optionally includes adding alignment characters that include one or more 8b10b comma symbols to the received data.

In Example 9, the subject matter of one or any combination of Examples 6-8 optionally includes multiplexing the data received on the multiple data lanes according to the HDMI protocol to the lesser number of data lanes for transmission according to the second communication protocol, and wherein the alignment characters are inserted after the multiplexing.

In Example 10, the subject matter of one or any combination of Examples 6-9 optionally includes inserting alignment characters to demarcate character boundaries in the 8b10b encoded data to be transmitted via the serial link.

In Example 11, the subject matter of one or any combination of Examples 5-10 optionally includes receiving video, audio, and data guard band characters according to the HDMI protocol, and replacing the video, audio, and data guard band characters with 8b10b encoded control symbols.

In Example 12, the subject matter of one or any combination of Examples 5-11 optionally includes replacing at least a portion of the control region following the video data of a data packet of the HDMI protocol with a trailing video guard band that includes 8b10b encoding.

In Example 13, the subject matter of Example 12 optionally includes replacing bits of the control region with a same number of bits of 8b10b encoding.

In Example 14, the subject matter of one or both of Examples 12 and 13 optionally includes replacing the control region with one or more 8b10b control symbols.

In Example 15, the subject matter of one or any combination of Examples 1-14 optionally includes scrambling data transmitted via the serial link and descrambling data received via the serial link.

In Example 16, the subject matter of Example 15 optionally includes transmitting a scrambling control character to indicate reset of the scrambling.

In Example 17, the subject matter of Example 16 optionally includes replacing a scrambling control character of the first communication protocol with an 8b10b encoded scramble control character.

In Example 18, the subject matter of one or any combination of Examples 1-17 optionally includes generating a link clock signal at the receiver using a data rate of data received via the serial link; and converting the link clock signal to the clock signal of the first communication protocol.

Example 19 can include subject matter (such as a transmitter for communicating data via a serial link with a receiver), or can optionally be combined with one or any combination of Examples 1-18 to include such subject matter, comprising an input including multiple input data lanes and a clock lane, wherein the input is configured to concurrently receive data on the multiple input data lanes aligned with a clock signal received on the clock lane according to a multi-lane communication protocol; an output interface to the serial link, wherein the output interface is a clock-less interface and includes a number of output data lanes less than a number of the multiple input data lanes; and translation circuitry configured to translate the data received according to the multi-lane communication protocol to a serial link communication protocol for transmission on the serial link.

In Example 20, the subject matter of Example 19 optionally includes translation circuitry configured to translate video data received according to a high definition multi-media interface (HDMI) protocol to the serial link protocol.

In Example 21, the subject matter of Example 20 optionally includes an input including three input data lanes and the clock lane, and the output interface includes one or two data lanes.

In Example 22, the subject matter of one or any combination of Examples 19-21 optionally includes translation circuitry configured to increase a data edge rate of video data received according to the multi-lane communication protocol in video data transmit according to the serial link protocol.

In Example 23, the subject matter of Example 22 optionally includes data received on the input data lanes that includes the video data and the clock lane receives a source video clock signal, wherein the transmitter includes link clock circuitry configured to generate a link clock signal using the source video clock signal, and provide translated data to the output interface according to the link clock signal.

In Example 24, the subject matter of one or any combination of Examples 19-23 optionally includes translation circuitry that includes encoding circuitry configured to encode data received on the multiple input data lanes using eight-bit to ten-bit (8b10b) encoding; and serialiser circuitry configured to multiplex the data received on the multiple input data lanes to the output data lanes.

In Example 25, the subject matter of Example 24 optionally includes a multi-lane protocol that includes an HDMI protocol and the received data includes an HDMI data packet that includes a control region, and wherein the serialiser circuitry is configured to replace characters of the control region with 8b10b encoded alignment characters.

In Example 26, the subject matter of one or both of Examples 24 and 25 optionally includes serialiser circuitry configured to add 8b10b comma symbols to demarcate boundaries in the received data to be transmitted according to the second communication protocol.

In Example 27 the subject matter of one or any combination of Examples 24-26 optionally includes serialiser circuitry configured to add the encoded alignment characters to the received data after the received data is multiplexed for transmission via the output data lanes.

In Example 28, the subject matter of one or any combination of Examples 24-27 optionally includes scrambling circuitry configured to scramble data for transmission on the serial link, wherein the serialiser circuitry is configured to insert a scrambling control character into the data that indicates scrambling reset.

Example 29 can include subject matter (such as a receiver for communicating data via a serial link with a transmitter), or can optionally be combined with one or any combination of Examples 1-28 to include such subject matter, comprising an input interface to the serial link, wherein the input interface is a clock-less interface and is configured to receive data via a number of data lanes according to a serial link communication protocol; an output including a clock lane and number of data lanes greater than the number of data lanes of the input interface, wherein data is provided on the data lanes of the output aligned with a clock signal provided on the clock lane according to a multi-lane communication protocol; and translation circuitry configured to translate the data received according to the serial link communication protocol to the multi-lane communication protocol; and clock generator circuitry configured to generate the clock signal using the data received according to the serial link communication protocol.

In Example 30, the subject matter of Example 29 optionally includes translation circuitry configured to translate video data received according to the serial link protocol at the input interface to video data provided at the output according to a high definition multi-media interface (HDMI) protocol.

In Example 31, the subject matter of Example 30 optionally includes clock generator circuitry configured to generate a link clock signal using a data rate of data received at the input interface, and convert the link clock signal to the clock signal of the first communication protocol.

In Example 32, the subject matter of Example 31 optionally includes clock circuitry configured to generate an HDMI video clock using the generated clock signal.

In Example 33, the subject matter of one or any combination of Examples 30-32 optionally includes an input interface that includes one or two data lanes and the output includes three data lanes and the clock lane.

In Example 34, the subject matter of one or any combination of Examples 29-33 optionally includes deserialiser circuitry configured to de-multiplex data received at the input interface to data provided on the multiple output data lanes, and decoder circuit configured to decode 8b10b encoded data received at the input interface.

In Example 35, the subject matter of Example 34 optionally includes descrambling circuitry configured to descramble data received at the input interface.

Example 36 can include subject matter (such as a data communication system), or can optionally be combined with one or any combination of Examples 1-35 to include such subject matter, comprising a transmitter circuit including: a transmitter input including a number of input data lanes and a clock lane, wherein the input is configured to concurrently receive data on the multiple input data lanes aligned with a clock signal received on the clock lane according to a multi-lane communication protocol; a transmitter output including a number of output data lanes less than the number of the input data lanes and operatively coupled to a serial link; and transmitter translation circuitry configured to translate the data received according to the multi-lane communication protocol to a clock-less serial link communication protocol for transmission on the serial link; and a receiver circuit including: a receiver input configured to receive data from the output data lanes of the transmitter circuit via the serial link according to the serial link communication protocol; a receiver output including a clock lane and number of data lanes greater than the number of data lanes of the input interface, wherein data is provided on the data lanes of the output aligned with a clock signal provided on the clock lane according to the multi-lane communication protocol; receiver translation circuitry configured to translate the data received according to the serial link communication protocol to the multi-lane communication protocol; and clock generator circuitry configured to generate the clock signal using the data received according to the serial link communication protocol.

In Example 37, the subject matter of Example 36 optionally includes a plurality of transmitter circuits; a plurality of receiver circuits; a switching circuit operatively coupled to outputs of the plurality of transceiver circuits and inputs of the plurality of receiver circuits; wherein the switch circuit is configured to selectively connect an output of a transmitter circuit to an input of a receiver circuit In Example 38, the subject matter of Example 37 optionally includes an input of a transmitter circuit of the plurality of transmitter circuits that includes three data lanes and the clock lane, and the multi-lane communication protocol includes a high definition multi-media interface (HDMI) protocol.

In Example 39, the subject matter of one or both of Examples 37 and 38 optionally includes a printed circuit board (PCB), wherein the plurality of transmitter circuits, the plurality of receiver circuits, and the switching circuit are included on the PCB.

In Example 40, the subject matter of one or both of Examples 37 and 38 optionally includes a first PCB, a second PCB, and a back plane interconnection, wherein the switching circuit is configured to selectively connect the output of the transmitter circuit to the input of a receiver circuit via the backplane interconnection.

These non-limiting Examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in an aspect are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

What is claimed is:

1. A method of controlling operation of a serial link, the method comprising:
   receiving data at a transmitter of the serial link according to a first communication protocol that includes a high definition multi-media interface (HDMI) protocol, wherein the first communication protocol includes receiving the data on multiple data lanes concurrently and aligned with a clock signal received on a clock lane;
   translating the received data received according to the first communication protocol to a second communication protocol for transmission on the serial link, wherein the second communication protocol is a serial link communication protocol that excludes the clock signal and the translating includes removing HDMI-specific characters in the received data and adding alignment characters to the received data to be transmitted according to the second communication protocol; and
   transmitting the received data from the transmitter to a receiver of the serial link according to the second communication protocol using less data lanes than the first communication protocol.

2. The method of claim 1, including receiving the transmitted data at the receiver of the serial link and recovering the multiple data lanes and the clock signal of the first communication protocol from the received transmitted data.

3. The method of claim 2, wherein the receiving the data at the transmitter includes receiving video data on three data lanes according to a high definition multi-media interface (HDMI) protocol, and wherein the transmitting the received data includes transmitting the video data on one data lane without the clock signal.

4. The method of claim 1, including translating the data received at the transmitter from the first communication protocol to the second communication protocol, wherein data transmitted according to the second communication protocol includes a higher edge rate for the same data received using the first communication protocol.

5. The method of claim 1, wherein the second communication protocol includes eight-bit to ten-bit (8b10b) encoding.

6. The method of claim 5, wherein the alignment characters include 8b10b control symbols that demarcate boundaries in the received data to be transmitted.

7. The method of claim 1, wherein removing HDMI-specific characters includes removing characters from a control region of an HDMI data packet and replacing the characters with the alignment characters.

8. The method of claim 1, including multiplexing the data received on the multiple data lanes according to the HDMI protocol to a lesser number of data lanes for transmission according to the second communication protocol, and wherein the alignment characters are inserted after the multiplexing.

9. The method of claim 5, wherein data received according to the HDMI protocol includes video, audio, and data guard band characters, and wherein the method further includes replacing the video, audio, and data guard band characters with 8b10b encoded control symbols.

10. The method of claim 5, wherein a data packet of the HDMI protocol includes a control region following video data of the data packet, and wherein the method further includes replacing at least a portion of the control region following the video data with a trailing video guard band that includes 8b10b encoding.

11. The method of claim 1, including receiving the transmitted data at the receiver of the serial link and recovering the clock signal of the first communication protocol by generating a link clock signal at the receiver using a data rate of data received via the serial link; and converting the link clock signal to the clock signal of the first communication protocol.

12. A data communication apparatus including a transmitter circuit for communicating data via a serial link with a receiver, the transmitter circuit comprising:
 a transmitter input including multiple input data lanes and a clock lane, wherein the transmitter input is configured to concurrently receive data on the multiple input data lanes aligned with a clock signal received on the clock lane according to a multi-lane communication protocol,
 a transmitter output interface to the serial link, wherein the output interface is a clock-less interface and includes a number of output data lanes less than a number of the multiple input data lanes; and
 transmitter translation circuitry configured to translate the data received according to the multi-lane communication protocol to a serial link communication protocol for transmission on the serial link, including translating data received according to a high definition multimedia interface (HDMI) protocol to the serial link communication protocol; and removing HDMI-specific characters in the received data and adding alignment characters to the received data to be transmitted according to the serial link communication protocol.

13. The data communication apparatus of claim 12, wherein the transmitter input includes three input data lanes and the clock lane, the output interface includes one or two data lane.

14. The data communication apparatus of claim 12, wherein the transmitter translation circuitry is configured to increase a data edge rate of video data received according to the multi-lane communication protocol in video data transmit according to the serial link protocol.

15. The data communication apparatus of claim 14, wherein the data received on the input data lanes of the transmitter input includes the video data and the clock lane receives a source video clock signal, wherein the transmitter circuit includes link clock circuitry configured to generate a link clock signal using the source video clock signal, and provide translated data to the output interface according to the link clock signal.

16. The data communication apparatus of claim 12, wherein the transmitter translation circuitry includes encoding circuitry configured to encode data received on the multiple input data lanes using eight-bit to ten-bit (8b10b) encoding; and serialiser circuitry configured to multiplex the data received on the multiple input data lanes to the output data lanes.

17. The data communication apparatus of claim 16, wherein the received data includes an HDMI data packet that includes a control region, and wherein the serialiser circuitry is configured to replace characters of the control region with 8b10b encoded alignment characters.

18. The data communication apparatus of claim 12, including a receiver circuit for communicating data via a serial link with a transmitter, the receiver circuit comprising:
 a receiver input interface to the serial link, wherein the input interface is a clock-less interface and is configured to receive data via a number of data lanes according to a serial link communication protocol;
 a receiver output including a clock lane and number of data lanes greater than the number of data lanes of the input interface, wherein data is provided on the data lanes of the output aligned with a clock signal provided on the clock lane according to a multi-lane communication protocol;
 receiver translation circuitry configured to translate the data received according to the serial link communication protocol to the multi-lane communication protocol; and
 receiver clock generator circuitry configured to generate the clock signal using the data received according to the serial link communication protocol.

19. The data communication apparatus of claim 18, wherein the receiver translation circuitry is configured to translate video data received according to the serial link communication protocol at the input interface to video data provided at the output according to the HDMI protocol.

20. The data communication apparatus of claim 19, wherein the receiver clock generator circuitry is configured to generate a link clock signal using a data rate of data received at the input interface, and convert the link clock signal to the clock signal of the first communication protocol.

21. The data communication apparatus of claim 18, wherein the receiver input interface includes one or two data lanes, and wherein the receiver further includes deserialiser circuitry configured to de-multiplex data received at the input interface to data provided on the multiple output data lanes, and decoder circuit configured to decode 8b10b encoded data received at the input interface.

22. The data communication apparatus of claim 18, including: a plurality of transmitter circuits; a plurality of receiver circuits; a switching circuit operatively coupled to outputs of the plurality of transceiver circuits and inputs of the plurality of receiver circuits; wherein the switch circuit is configured to selectively connect an output of a transmitter circuit to an input of a receiver circuit.

23. The data communication apparatus of claim 22, including a printed circuit board (PCB), wherein the plurality of transmitter circuits, the plurality of receiver circuits, and the switching circuit are included on the PCB.

24. The data communication apparatus of claim 22, including a first PCB, a second PCB, and a back plane interconnection, wherein the switching circuit is configured to selectively connect the output of the transmitter circuit to the input of a receiver circuit via the backplane interconnection.

25. An apparatus for communicating data via a serial link, the apparatus comprising:
 means for receiving data on multiple data lanes of the apparatus according to a first communication protocol that includes a high definition multi-media interface (HDMI) protocol, wherein the first communication protocol includes receiving the data on the multiple data lanes concurrently and aligned with a clock signal received on a clock lane;

means for removing HDMI-specific characters in the received data and adding alignment characters to the received data to be transmitted according to a second communication protocol;

means for transmitting the received data from the transmitter to a receiver of the serial link according to the second communication protocol, where the second communication protocol excludes the clock signal and includes transmitting the received data via the serial link using less data lanes than the first communication protocol; and means for receiving the transmitted data at the receiver of the serial link and recovering the multiple data lanes and the clock signal of the first communication protocol from the received transmitted data.

* * * * *

UNITED STATES PATENT AND TRADEMARK OFFICE
CERTIFICATE OF CORRECTION

PATENT NO. : 10,594,892 B2
APPLICATION NO. : 15/685379
DATED : March 17, 2020
INVENTOR(S) : O'Neill et al.

Page 1 of 1

It is certified that error appears in the above-identified patent and that said Letters Patent is hereby corrected as shown below:

In the Claims

In Column 15, Line 29, in Claim 12, delete "protocol," and insert --protocol;-- therefor In Column 15, Line 47, in Claim 13, delete "lane." and insert --lanes.-- therefor Signed and Sealed this
Thirteenth Day of October, 2020

Andrei Iancu
*Director of the United States Patent and Trademark Office*